INVENTOR.
LEONARD E. AUSTIN
JOHN H. ETTINGER
ARTHUR K. BROWN
BY
ATTORNEY

United States Patent Office 2,846,144
Patented Aug. 5, 1958

2,846,144
SWITCH OPERATING MECHANISM

Leonard E. Austin, John H. Ettinger, and Arthur K. Brown, Jr., South Bend, Ind., assignors to Bendix Aviation Corporation, South Bend, Ind., a corporation of Delaware Application March 28, 1957, Serial No. 649,136

6 Claims. (Cl. 235—98)

This invention relates to a switch operating mechanism suitable for use in a power operated conveyor mechanism employed to transport different articles from place to place in a factory. In the processing of said articles, say, e. g. trays carrying different parts of a Ford brake unit, the empty trays are loaded, at different stations, onto support members mounted on the trolleys of the conveyor; then after being subsequently filled with the brake parts the trays are transported by the trolleys to certain stations and unloaded at said stations onto a chute or another power operated mechanism. The latter mechanism then operates to move the filled trays away from the conveyor mechanism in the processing cycle; and subsequently, after being emptied, the trays are returned to the support members on the trolleys.

Now with this mechanism certain of the trolleys of the conveyor carry trays loaded with, say, brake shoes of the aforementioned Ford brake unit; and certain other trolleys will, say, carry trays loaded with slave cylinders of said unit; and it is an object of our invention to provide a loader, unloader mechanism, including switch operating mechanism, operable, in cooperation with parts of the conveyor mechanism, to sequentially unload the brake shoe carrying trays at a certain station, the slave cylinder carrying trays at another station, and the other brake part carrying trays at their respective stations. It is a further object of our invention to so construct and arrange the parts of the aforementioned switch operating mechanism that the same, in its cooperation with parts of the conveyor mechanism and parts of the loader portion of the loader, unloader mechanism, will effect a certain sequential loading operation of empty trays back onto the trolleys of the conveyor mechanism.

It is a further object of our invention to provide, in a conveyor mechanism, a switch operating mechanism operable to facilitate the unloading, in a certain sequence, of a plurality of, say, brake shoe carrying trays, slave cylinder carrying trays, and other trays, at different stations, one station for each different tray; and to facilitate the sequential loading back onto the conveyor of said trays when empty.

Yet another object of our invention is to provide, in a conveyor mechanism adapted to process a plurality of different work pieces, a counter mechanism comprising a plurality of pawl and ratchet switch operating units, said units constituting part of a loader, unloader mechanism for processing the several work pieces; and it is a further object of our invention to so construct the several pawl and ratchet switch operating units that they will cooperate with switches of the counter mechanism to selectively process the work pieces as desired, e. g. as set forth above.

Other objects of the invention and desirable details of construction of parts will become apparent from the following detailed description of an illustrative embodiment of our invention, taken in conjunction with the accompanying drawings illustrating said embodiment, in which.

Figure 1:
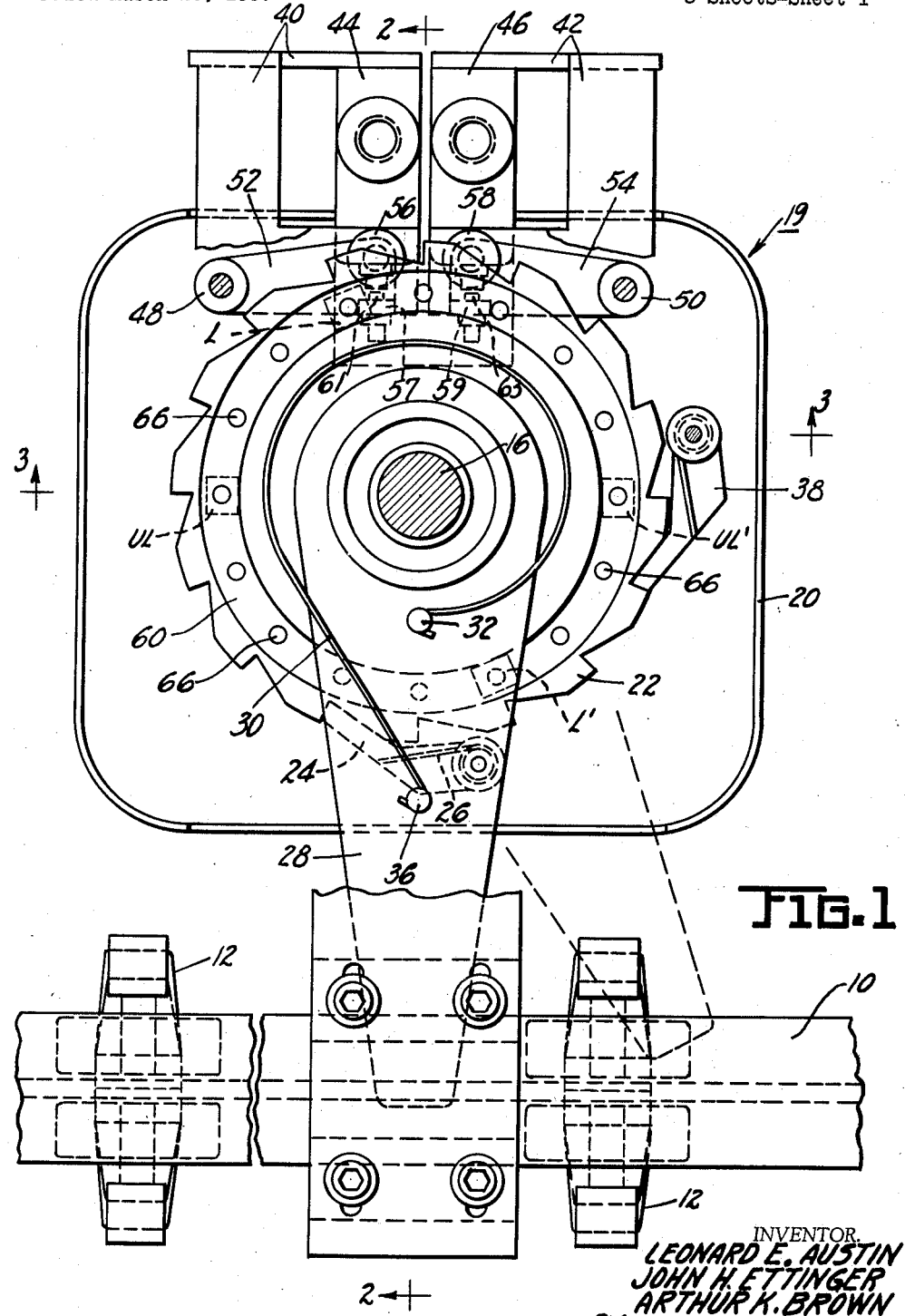
Figure 1 is a top plan view of one of the units of the counter mechanism of our invention shown in cooperation with a part of the I-beam and trolley mechanism of a conveyor mechanism.

Describing now a preferred embodiment of our invention, a power operated conveyor mechanism, of which the several units of our counter mechanism are a part, includes the usual I-beam 10 and movable trolleys 12 or their equivalent. These trolleys, as is the usual practice, are mounted on and movable along the I-beam by a power driven chain, not shown; and to certain of said trolleys, say, every other trolley, there are preferably detachably secured multishelved baskets or support members, not shown, adapted to carry full and empty tote boxes or trays. These trays carry, e. g. the parts of an automotive brake unit, say, a Ford brake, and every first basket, of each of a plurality of groups of, say, eight baskets, will carry trays loaded with, say, the shoes of this brake. Every second basket of each of said groups will carry trays of slave cylinders of the brake; every third basket of each group will carry trays carrying a certain nut of the brake; and every fourth basket of each group will carry trays carrying a certain bolt of the brake. The remaining four brakets of each group of eight will carry other parts of the brake. If desired, each and every trolley is equipped with a multishelved support member.

The I-beam and trolleys are not disclosed in detail in the drawings inasmuch as they do not, per se, constitute a part of our invention. The trolleys do, however, serve as part of the operating mechanism of our invention as will be described hereinafter; and as indicated above, and as will be brought out in the description to follow, the number of trolleys of the conveyor, and therefore the number of baskets, are, in the aforementioned example given, a multiple of a certain number; and this also is a feature of our invention.

Now a feature of our invention lies in the construction of a so-called counter unit 19, particularly a switch operating portion thereof; and the total number of these counter units is equal to the number of different brake parts being processed, that is eight in the example being described; one counter unit for each brake part. Only one of the eight counter units is disclosed in the drawings, the other seven being duplicates thereof; and these counter units are an important part of the hereinafter referred to loader, unloader mechanism, the remainder of which is not disclosed in the drawings. For the purposes of this description we will assume that the counter unit 19, Figure 1, is part of a loader, unloader mechanism for processing trays or tote boxes which carry brake shoes.

Figure 2:
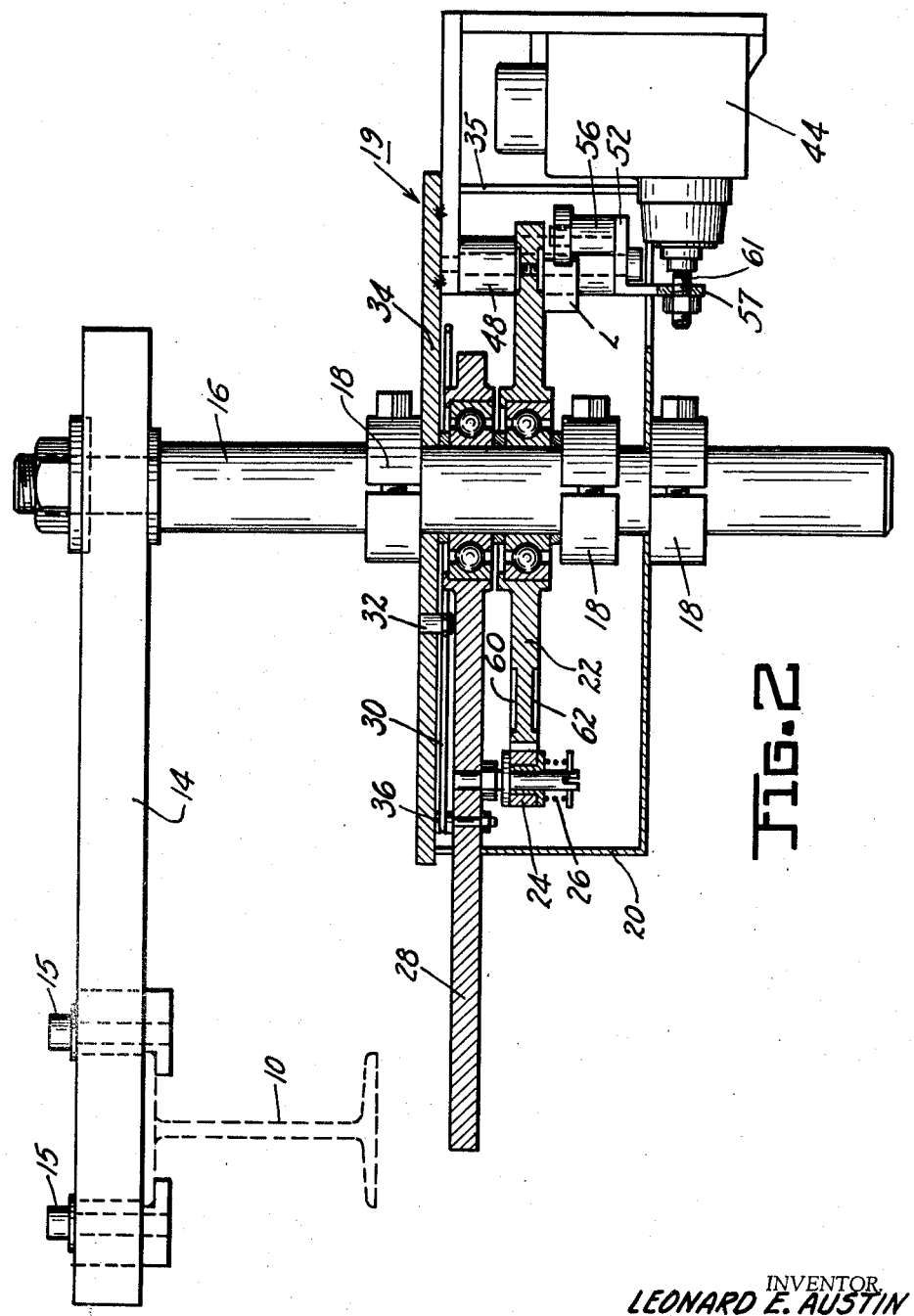
Figure 2 is a sectional view, taken on the line 2—2 of Figure 1, disclosing details of our counter mechanism; and, Figure 3 is a sectional view of the counter mechanism taken on the line 3—3 of Figure 1.

Referring to Figure 2 of the drawings, a rectangular shaped support member 14, extending laterally of and secured to the I-beam 10 by fastening 15, supports a post 16 of the counter unit. Collar members 18, secured to the post 16, serve to secure a rectangular shaped box-like housing member 20 to said post; and the latter extends through the member 20. An important feature of our invention lies in a switch operating portion of the counter unit, said portion comprising a disk shaped ratchet member 22 rotatably mounted on the post 16 as disclosed in Figure 2. A pawl member 24, biased into engagement with the teeth of the ratchet member by a spring 26, is mounted on an arm 28 which is rotatably mounted on the post 16. A spring 30, secured at one of its ends by a pin 32 to a cover plate 34 for the housing member 20, and at its other end by a pin 36 to the arm 28, serves, after being cocked, to rotate the arm 28 and ratchet 22 clockwise, Figure 1, to close the hereinafter disclosed switch mechanism. A pawl member 38 serves to prevent a counterclockwise rotation of the ratchet member 22 when the arm 28 and its attached pawl 24 are being rotated to cock the spring 30.

Angular shaped bracket members 40 and 42, fixedly secured to the cover member 34 as disclosed in Figure 2 and extending within a notched out portion 35 of the housing 20, serve as mountings for juxtaposed switch members 44 and 46 secured thereto; and to each of said bracket members 40 and 42 there is pivotally secured, by posts 48 and 50, respectively, switch operating lever members 52 and 54. To the latter members there are secured, respectively, posts 56 and 58 having roller members rotatably mounted at their ends. The posts 56 and 58 are of different heights for a purpose to be described hereinafter. As disclosed in Figure 2, the switch operating lever members are provided with downwardly extending flanges 57 and 59 having adjustably mounted thereon switch operating members 61 and 63. The ratchet member 22 is provided with an annular recess 60 on one of its faces, and a similar recess 62 on its opposite face; and said member is provided with 16 equidistantly spaced openings 66, the number 16 being a multiple of the number 8 for reasons given herein.

Figure 3:
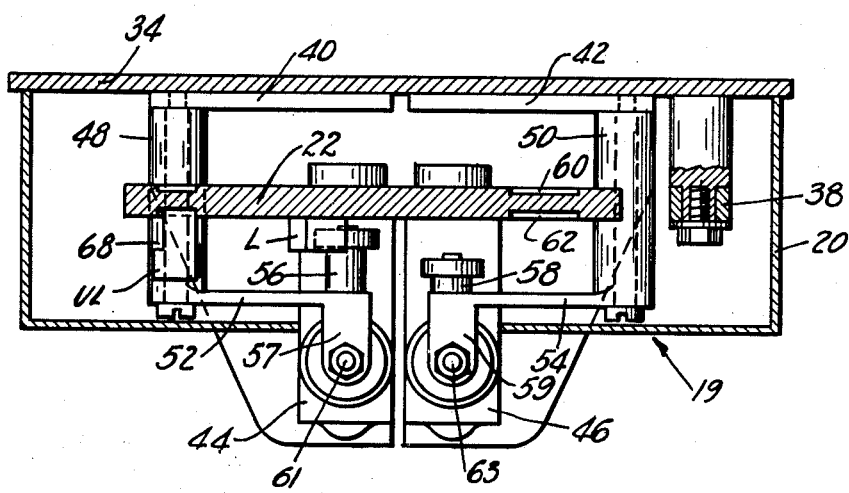

As disclosed in Figures 1 and 2, a lever operating cube shaped member L is secured to the ratchet at one of the openings 66; and at the eighth opening remote from said member L, counting in a counterclockwise direction, there is a lever operating member L' secured to the ratchet at another opening 66. Suitable fastening means, extending through said openings, serve to secure the members L and L' to the ratchet. In a counterclockwise direction from the member L there is a generally parallelepiped shaped lever operating member UL notched at 68, Figure 3, this member being spaced two openings from the member L; and spaced eight openings from the member UL, counting in a counterclockwise direction, there is a lever operating member UL' shaped like the member UL. The aforementioned lever operating members serve, with a rotation of the ratchet, to contact the switch operating lever members to operate the switches 44 and 46.

Enlarging upon the description of the above described conveyor mechanism, and referring to its associated loader, unloader mechanism, only one of the counter units of which is shown, it is to be noted that there are eight duplicate counter units placed side-by-side along the conveyor; and said units are the major control means for separate loader, unloader mechanisms handling the trays which carry the eight different articles being processed. No claim is made to the loader, unloader mechanism, per se, accordingly the same is not disclosed in this application. Suffice it to say that the switch 44, when closed, initiates a loading operation of the loader, unloader mechanism associated with the unit 19 of Figure 1 to place the brake carrying trays back onto the proper support members on the trolleys, said operation being quickly effected as a certain trolley passes by the counter unit 19; and when the switch 46 is closed there is initiated a brake tray unloading operation of the loader, unloader mechanism controlled by the unit 19 of Figure 1; and this operation is quickly effected as the aforementioned certain trolley, with its work piece supporting member mounted thereon passes by the unit 19. The loaded trays, positioned on one shelf of the basket, pie rack or other support member on the trolleys are preferably pushed off of said member and said trays, when empty, are then preferably pushed back onto another shelf of the support member.

Describing now the complete operation of the mechanism of our invention it is to be noted that, by virtue of the particular setting up of the parts of the entire mechanism before the conveyor operation is initiated, there results, with a movement of the conveyor, a successive or, better described, sequential operation of the eight counter units in their respective jobs of processing the trays for the eight different articles being handled. As to this set up, and particularly noting the position of the member L with respect to the roller on the post 56, Figures 1 and 3, it is to be noted that the brake shoe processing counter 19 of Figure 1 will initiate a loading operation with the first operation of said counter. This operation will be initiated when the trolley 12, to the left in Figure 1, moves in the direction of the arrow in said figure to strike the arm 28, moving it to the dotted line position of Figure 1 to cock the spring 30; then as said trolley leaves the arm 28 the spring 30 will operate to move said arm and ratchet as a unit to close the switch 44. Now at the same time this operation is taking place the trolley 12, located to the right in Figure 1, is moving into position preparatory to, with the next increment of movement of the trolleys, actuate, say, the brake cylinder counter unit, not shown, to the right of the brake shoe processing counter 19 of Figure 1. Eventually, after the eight different loading operations are completed in sequence, the lever operating member L' operated to again effect a loading operation of the brake shoe counter 19 thereby beginning the operation of another sequence of operations.

As to the unloading operations of the several trays they are also effected in sequence, the first sequence being initiated when the member UL, Figure 1, actuates the roller of the member 58 to close the switch 46. In this operation the notch 68 in the member UL makes it possible to pass the roller on the post 56 without striking the same to close the switch 44.

There is thus provided a conveyor mechanism comprising a plurality of loader, unloader units for sequentially loading and unloading a plurality of tray members onto and off of said mechanism. The instant application describes the sequential processing of eight different articles; however, this number may be increased by increasing the number and height of the posts, such as the posts 56 and 58, and by increasing the number and notched shape of the lever operating members such as the members L and UL.

We claim:

1. A conveyor mechanism adapted, by means of trays, to transport a certain number of different types of work pieces from place to place said mechanism comprising a trolley supporting member, a plurality of trolleys, the total of which is a multiple of a certain number, mounted on and movable along said supporting member, tray carrying members secured to certain of said trolleys there being groups of said members each group totaling in number the aforementioned certain number and the several members going to make up each group being so positioned on the trolleys as to pass by a certain point in a certain sequence; power operated loader, unloader mechanism mounted adjacent the trolleys said mechanism including a plurality of counter units which units include a plurality of switches operable to control the power means of the loader, unloader mechanism there being one switch of each counter unit which controls a portion of the loader portion of said mechanism and one switch of each counter unit which controls a portion of the unloader portion of said mechanism.

2. A conveyor mechanism adapted, by means of trays, to transport a certain number of different types of work pieces from place to place said mechanism comprising a trolley supporting member, a plurality of trolleys, the total of which is a multiple of a certain number, mounted on and movable along said supporting member, a work piece carrying member secured to each trolley there being groups of said members each group totaling in number the aforementioned certain number and the several members going to make up each group being so positioned on the trolleys as to pass by a certain point in a certain sequence; power operated loader, unloader mechanism mounted adjacent the trolleys said mechanism including a plurality of counter units which units, totaling in number the aforementioned certain number, are actuated by the trolley units and include a plurality of switches operable to control the power means of the loader, unloader mechanism there being one switch of each counter unit which controls a portion of the loader portion of said mechanism and one switch for each counter unit which controls a portion of the unloader portion of said mechanism.

3. A counter mechanism adapted to be employed in a conveyor mechanism said counter mechanism including a housing member, a plurality of brackets mounted on said housing member, a plurality of switches mounted on said brackets, and switch operating means housed within said housing member and comprising a support post extending through said member, a pawl and ratchet unit mounted on said post, and a plurality of switch operating lever members pivotally mounted on the brackets and actuated by the ratchet portion of the pawl and ratchet unit.

4. A counter mechanism adapted to be employed in a conveyor mechanism said counter mechanism including a housing member, a plurality of brackets mounted on said housing member, a plurality of switches mounted on said brackets, and switch operating means housed within said housing member comprising a support post extending through said member, a pawl and ratchet unit, including a ratchet member comprising a plurality of spaced lever operating members, mounted on said post, and a plurality of switch operating lever members pivotally mounted on the brackets and actuated by the lever operating members on the ratchet member.

5. A counter mechanism adapted to be employed in a conveyor mechanism said counter mechanism including a housing member, a plurality of brackets mounted on said housing member, a plurality of switches mounted on said brackets, and switch operating means housed within said housing member comprising a support post extending through said member, a pawl and ratchet unit, including a ratchet member comprising a plurality of spaced lever operating members, mounted on said post, and a plurality of switch operating members pivotally mounted on the brackets and actuated by the lever operating members on the ratchet member, said lever members having post members of different lengths each lever member cooperating with a certain type of lever operating member whereby with an operation of the ratchet member there is effected a certain selective operation of the switch operating lever members.

6. A counter mechanism adapted to be employed in a conveyor mechanism said counter mechanism including a housing member, a plurality of brackets secured, in juxtaposition, to the housing member, a plurality of switches mounted on said brackets, and switch operating means housed within said housing member and comprising a support post extending through said member, a pawl and ratchet unit, including a ratchet member comprising a plurality of equidistantly spaced block shaped lever operating members, rotatably mounted on said support post, a plurality of switch operating lever members pivotally mounted on the brackets and actuated by the lever operating members on the ratchet member, an arm member rotatably mounted on the post, and yieldable means secured at one of its ends to the housing member and at its other end to said arm, for rotating the arm to effect a switch operating operation of the ratchet member.

No references cited.